United States Patent [19]

Shisheng

[11] Patent Number: 5,225,010
[45] Date of Patent: Jul. 6, 1993

[54] TIRE WITH INCLINED ELASTIC SUPPORT BLOCKS ON ITS OUTER SURFACE

[76] Inventor: Li Shisheng, 5-401, Xiaonanzhuang, Haidian district, Beijing 100081, China

[21] Appl. No.: 721,116

[22] Filed: Jun. 26, 1991

[30] Foreign Application Priority Data

Jul. 7, 1990 [CN] China ............... 90103275.1

[51] Int. Cl.$^5$ .................. B60C 7/10; B60C 11/11
[52] U.S. Cl. ................ 152/168; 152/209 R; 152/209 B; 301/43
[58] Field of Search ............ 152/155, 159, 168, 169, 152/173, 174, 176, 209 R, 209 B, 209 D, 323, 301, 305; 301/41 R, 43, 43 RT, 44 T

[56] References Cited

U.S. PATENT DOCUMENTS

| 2,188,196 | 1/1940 | Wanek | 152/209 B |
| 2,891,594 | 6/1959 | Ford | 152/209 B |
| 3,630,257 | 12/1971 | Goldberger | 152/301 |

FOREIGN PATENT DOCUMENTS

| 0143107 | 7/1985 | Japan | 152/209 R |
| 0071709 | 4/1987 | Japan | 152/209 B |
| 0097405 | 4/1988 | Japan | 152/209 R |
| 1-97101 | 8/1989 | Japan | 152/323 |
| 2-175305 | 7/1990 | Japan | 152/209 D |
| 0384182 | 8/1990 | Japan | 152/209 R |
| 2-293205 | 12/1990 | Japan | 152/209 R |

Primary Examiner—Michael W. Ball
Assistant Examiner—Nancy T. Krawczyk
Attorney, Agent, or Firm—Ladas & Parry

[57] ABSTRACT

The present invention provides a tire with inclined elastic support blocks on its outer surface, wherein, a number of elastic convex blocks are uniformly arranged on and integrated with the outer circumference surface of the tire, which direct against the rotation direction of the tire, and in each convex block there is a branch of a ring arbor which inclination direction is in accordance with said convex block. By using this kind of tire, The braking distance of the vehicle equipped with said tire is shorter, the starting moment is less and the vehicle has a good comfortability.

1 Claim, 4 Drawing Sheets

TIRE WITH INCLINED ELASTIC SUPPORT BLOCKS ON ITS OUTER SURFACE

INTRODUCTION

The present invention relates a kind of tire, especially a kind of tire used on wheeled transport machinery, which is particularly suitable to be used as the tires of various automobiles, and which can be used as not only a cover tire of a pneumatic tire with a tire tube, but also a nonpneumatic tire without tire tube.

According to the present invention, there is provided a tire with inclined elastic support blocks on its outer surface characterized by that some uniformly distributed and separated elastic support blocks, i.e. convex blocks or convex teeth, are arranged on the outer circumference surface of said tire; said convex block does not extend along the radical direction of the tire, but inclines towards the opposite direction of the linear velocity direction of the outer tire circumference surface where said convex block is situated; the angle between the center line of said convex block and the tangent line of the outer tire circumference surface where said convex block is situated is an acute angle; in said each elastic support block or convex block a branch of a ring arbor may be embedded, and said branch of the ring arbor is embedded in rubber of the tire to form an inclined convex block which is integrated with the tire.

BACKGROUND OF THE INVENTION

On the tire surface of the traditional various tires some figured convex blocks are arranged. Said figured convex blocks extend along the radical direction of the tire everywhere on the tire surface to form convex blocks with various shapes, so as to form antiskid figures on the tire surface of the tire. Said figured convex blocks of the tire are all perpendicular to the tangent line of the tire surface where corresponding convex block is situated. This type of radical figures have been widely used, but they have following disadvantages:

(1) the braking distance is long;

(2) the starting of the vehicle requires a larger moment, because, to make the vehicle start to move, the starting moment applied on the driving wheel is used not only to overcome the starting inertia, but also to overcome the rolling resistance moment of the tire, and the right figures extending radically of the traditional tire do not contribute to overcoming the rolling resistance moment;

(3) riding comfortability is worse.

So, the object of the present invention is to propose a tire with inclined elastic support blocks on its outer surface so as to improve the braking performance of the vehicle, shorten braking distance, improve riding comfortability, and reduce the starting moment used to make the vehicle start to move.

SUMMARY OF THE INVENTION

The present invention proposes a tire with inclined elastic support blocks on its outer surface, wherein, some elastic support convex blocks are uniformly distributed on the outer tire circumference surface of said tire, which direct against the rotation direction of the tire, i.e., incline towards the opposite direction of the linear velocity direction of the outer surface of the tire; said convex blocks are integrated with the tire and in each convex block a branch of a ring arbor is embedded, which inclination direction is in accordance with that of said convex block; said ring arbor is made of elastic metal or elastic nonmetal; the angle between the center line of said convex block and the linear velocity direction of the tire surface where said convex block is situated is an acute angle. Said tire can be a solid tire without tire tube, and can also be a tire without ring arbor.

Detailed description of the invention

The present invention proposes a tire with inclined elastic support blocks on its outer surface, wherein, some elastic support convex blocks are uniformly distributed on and integrated with the outer tire circumference surface of said tire, said convex blocks direct against the rotation direction of the tire, i.e., incline towards the opposite direction of the linear velocity direction of the outer tire surface of the tire; the angle between the center line L of said convex block and the linear velocity direction of the tire surface where said convex block is situated is an acute angle of 30°-80°; the cross section of said convex block is a rectangle, and its vertical section is basically a rectangle, but on the top of said convex block there is a flange extended along the local linear velocity direction; regarding to the pneumatic tire, the extension length of the convex block is about 1/40-1/10 of the radius of the tire; and regarding to the nonpneumatic tire, the extension length of the convex block is about 1/40-1/5 of the radius of the tire; in each said convex block there is a branch of a ring arbor made of elastic metal or elastic nonmetal (e.g. plastics); said branch of the ring arbor is embedded in the rubber so as to form convex block and said convex block is integrated with the tire surface.

Said ring arbor has a ring arbor body, and some branches are arranged on and integrated with the outer circumference surface of the ring arbor body, which inclination direction, inclination angle, arrangement interval and number are all in accordance with corresponding convex blocks and which have identical length; said ring arbor body integrated with its branches is embedded in the rubber of the tire; several ring arbors are parallelly arranged and embedded in the rubber of the tire, and each branch of said ring arbors is respectively embedded in corresponding convex block along the center line of said convex block.

Because said convex blocks direct against the rotation direction of the tire, i.e., incline towards the opposite direction of the linear velocity direction of the tire surface where said convex block is situated, i.e., the convex blocks contacted with road surface incline towards the moving direction of the vehicle, during the vehicle is being braked, the convex blocks contacted with the road surface would scrape the road surface, and therefore the braking distance the vehicle equipped with the tire of the present invention is shorter than that of the vehicle equipped with traditional tire. And the inclination arrangement of the convex blocks makes the deformation of the convex block greater so as to partly absorb the braking collision and the vibration produced by slight uneven on the road surface, and therefore the comfortability of the vehicle will be improved.

It is especially noted that the vehicle equipped with the tire of the present invention only requires less starting moment to make the vehicle start to move. On the traditional tire, the figured convex blocks all extend radically, as shown in FIG. 1 and FIG. 2. When the vehicle is in static state; the tire is contacted with the road surface, the reacting force formed by the gravitational force between the tire and the road surface is uniformly distributed, as shown p in FIG. 1, and the resultant force P directs towards the center O of the tire. When a starting moment Mc is applied on the driving wheel, the reacting force between the tire and the road surface would change, i.e., the reacting force on the front portion of the contact area is greater than that on the back portion of the contact area, and therefore the resultant force of the said reacting forces moves ahead so as not to direct towards the center O of the tire, so a rolling resistance moment Mr is formed ($Mr = P*1$, 1 is the distance between the center O of the tire and the direction line of the resultant force of the reacting forces between the tire and the road surface when the vehicle starts to move). Only when the starting moment Mc is greater than the rolling resistance moment Mr, the wheel is able to roll. During the starting process of the vehicle, the figured convex block 1 on the back portion of the convex area would rehabilitate by means of elastic force because the reacting force between said figured convex block 1 and the road surface reduces, and the elastic rehabilitating force of said convex block is acted on the road surface, and at the same time, road surface has a reacting force S sacted oin said convex block. Because the figured convex block of the traditional tire extends radically, the elastic rehabilitating force of said convex block is also radical, and the reacting force of the road surface to said convex block is also radical and directs towards the center O of the tire, so the elastic rehabilitating force of the figured convex block does not contribute to the rotation of the wheel of the vehicle; but on the tire surface of the present invention, there are some inclined elastic support blocks, i.e., convex blocks, and the inclination direction of said convex block directs against the rotation direction of the wheel, and therefore, the reacting force S' (as shown in FIG. 3) of the road surface to the convex block on the back portion of the contact area formed by means of the elastic rehabilitating force of said convex block is along the center line of said convex block, so the reacting force S' resulted from the elastic force does not direct towards the center O of the tire, and therefore the moment produced by the reacting force S' contributes to the rotation of the tire, so the tire of the present invention can reduce the starting moment, and contributes to the rolling of the wheel. On the other hand, when the vehicle vibrates up and down, the pressure of the tire to the road surface during the vehicle is falling may result in the deformation of said elastic support block, and the elastic rehabilitating force of said elastic support block acted on the road surface also contributes to the rotation of the wheel, and partly transforms the vibration energy of the wheel of the vehicle into the moving power of the vehicle.

The preferred embodiments of the tire with inclined elastic support blocks on its outer surface of the present invention is hereinafter detailed referred to the drawings.

Figure 1:
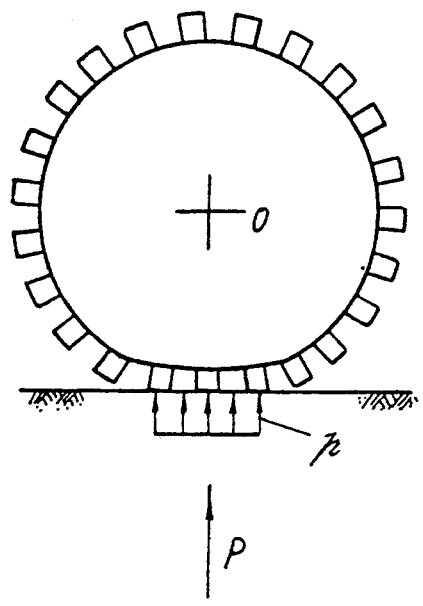
FIG. 1 is a force-analysing diagrammatic view of the traditional tire in static state.
Figure 2:
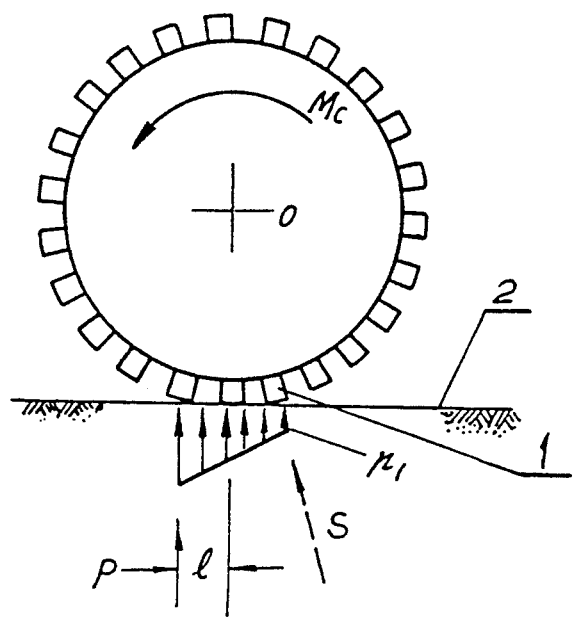
FIG. 2 is a force-analysing diagrammatic view of the traditional tire under the action of the starting moment during starting to move.
Figure 3:
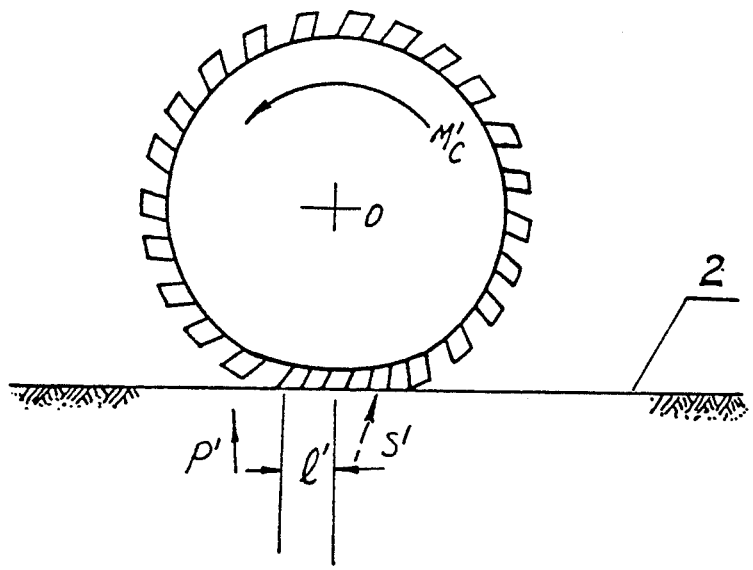
FIG. 3 is a force-analysing diagrammatic view of the tire of the present invention under the action of the starting moment during starting to move, indicating that the reacting forces S' produced by the elastic rehabilitating force of the convex block on the back portion of the contact area between the tire and the road surface does not direct towards the center O of the wheel.
Figure 4:
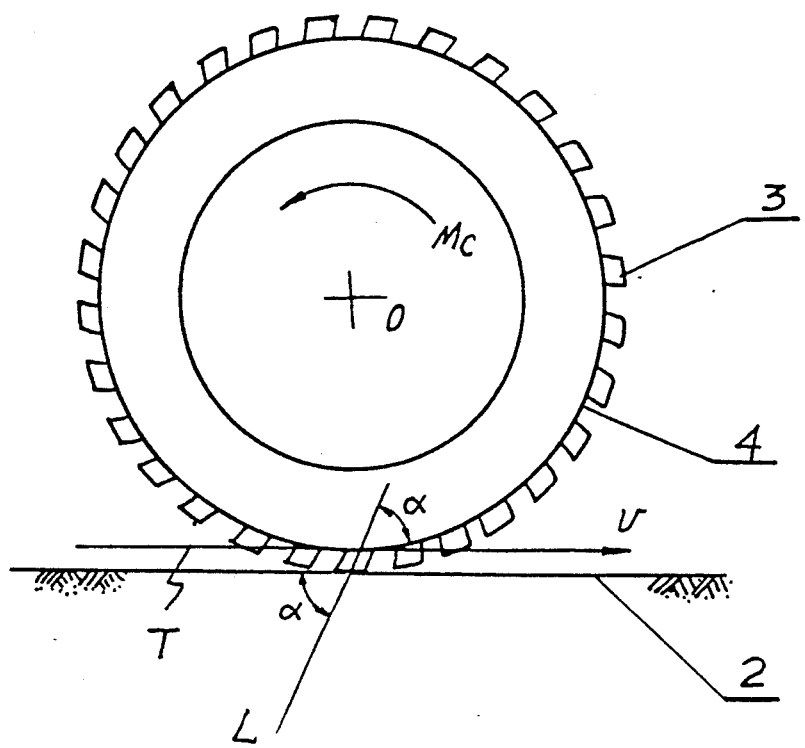
FIG. 4 is a front view of the tire of the present invention, wherein, the convex blocks on the tire surface are exaggeratively drawn so as to indicate clearly.
Figure 5:
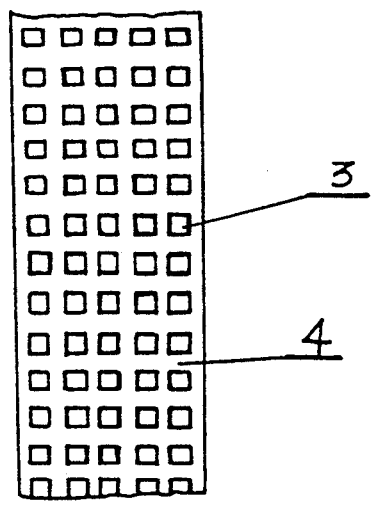
FIG. 5 is a developed plan view of the tire surface of the tire of the present invention, indicating that the convex blocks are uniformly and separately arranged.
Figure 6:
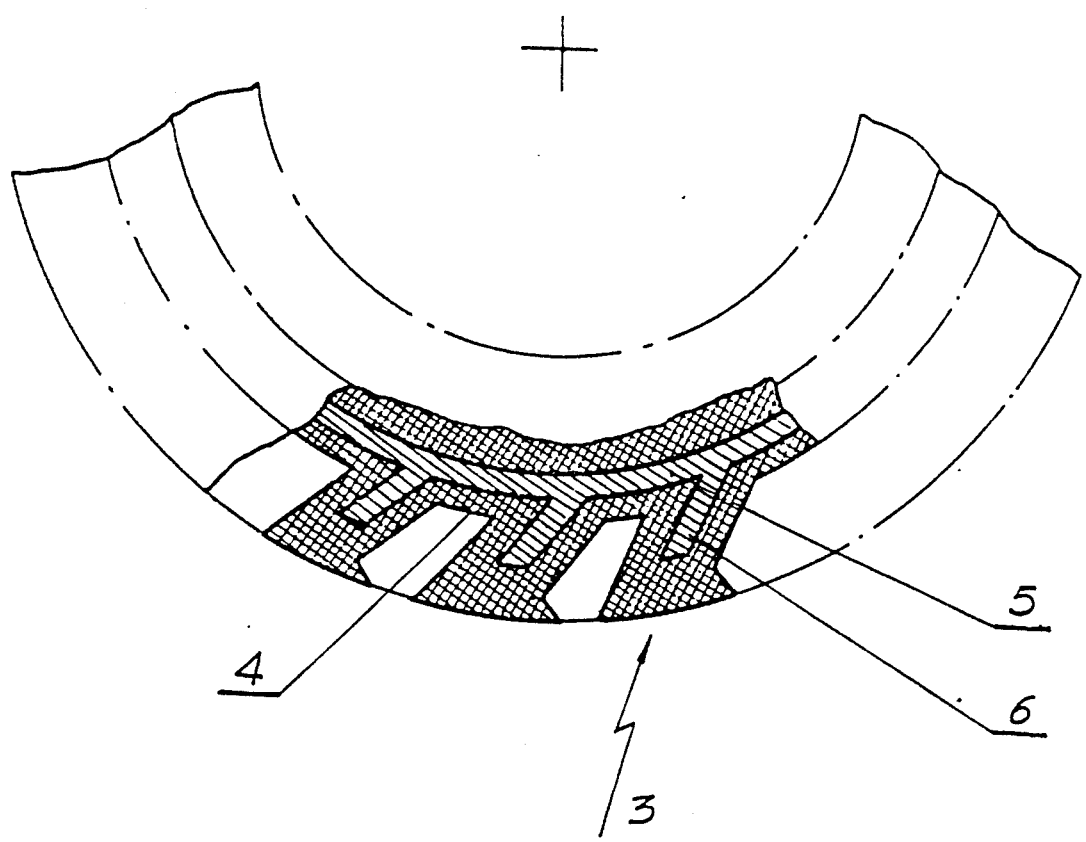
FIG. 6 is a part section view of the tire of the present invention.
Figure 7:
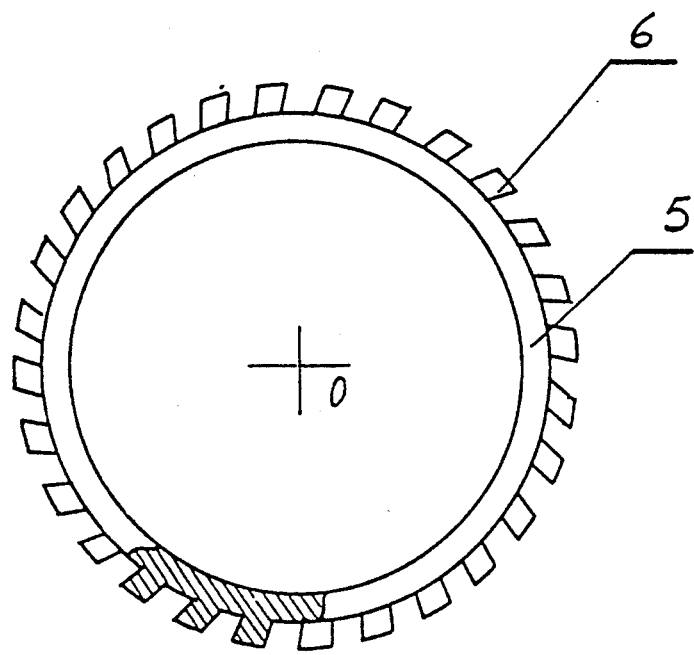
FIG. 7 is a front view of the ring arbor.

FIG. 3 and FIG. 4 are respectively the front view and the side view of the tire with elastic support blocks on its outer surface according to the first embodiment of the present invention. Some convex blocks 3 are uniformly distributed on and integrated with the circumference surface of the tire of type 4.50-12. The cross section of said convex block 3 is a rectangle, and its vertical section is basically a rectangle, but on its top, on the back portion related to the moving direction of the wheel there is a triangle flange, i.e., there is a flange which section shape is a triangle on the back portion related to the moving direction of the wheel. Said flange can prevent the wheel from sliding. The length of the convex block is 10 mm. There are five rows of convex blocks uniformly arranged on the circumference surface of the tire, said convex block directs against the rotation direction of the tire, i.e., inclines towards the opposite direction of the linear velocity direction of the tire surface 4 of the tire where said convex block 3 is situated. The angle between the center line of the convex block 3 and the tangent line of the tire surface 4 where the convex block 3 is situated is 30°-80°. In said tire some ring arbor may be embedded (as shown in FIG. 6); said ring arbor comprises a ring arbor body and a number of branches. Said ring arbor has a ring arbor body 5, and said inclined branches 6 are arranged on and integrated with the circumference surface of said ring arbor body 5; the number, arrangement, inclination angle and inclination direction of said inclined branches 6 are all in accordance with those of corresponding convex blocks. There are five ring arbors parallelly arranged and embedded in the rubber of the tire, and said each branch is also embedded in the rubber so as to form said convex block 3 on the tire surface. The ring arbor in this embodiment is made of metal.

The second embodiment of the present invention is similar to the first embodiment; the difference is only that the ring arbor is made of plastics.

The third embodiment of present invention is similar to the first embodiment; the difference is only that said tire is a solid tire without tire tube.

What is claimed is:

1. A tire comprising a plurality of inclined elastic convex support blocks being uniformly arranged on its outer surface and integrated with the surface, each said convex block being directed against a forward rotation direction of the tire and inclined towards an opposite direction of a linear velocity direction of the tire surface where said convex block is situated, such that an acute angle between a central line of the convex block and the linear velocity direction of the tire surface is formed, wherein the cross section of said convex block on the tire surface is rectangular and the vertical section of the convex block is basically rectangular, and a triangle flange being provided adjacent the top and on a back portion of the convex block, said triangle flange forming a part of the top of the convex block and pointing towards said linear velocity direction; and a plurality of arbors, which is able to deform elastically, being embedded in the tire, each said arbor including a body ring and a plurality of branches integrated with the outer circumferential surface of said arbor body ring, said arbor branches being uniformly arranged on the arbor ring and embedded in the convex blocks respectively in direct correspondence with the number, arrangement and inclination of the convex blocks, each said arbor branches extending along the center line of each said convex block.

* * * * *